United States Patent
Jolley et al.

(10) Patent No.: US 6,894,829 B2
(45) Date of Patent: May 17, 2005

(54) OPTICAL AMPLIFIER MODULES

(75) Inventors: Nigel Edward Jolley, Bishop's Stortford (GB); Fiona Davis, Bishop's Stortford (GB); Richard Edward Epworth, Sawbridgeworth (GB)

(73) Assignee: Nortel Networks Limited, St. Laurent (CA)

( * ) Notice: Subject to any disclaimer, the term of this patent is extended or adjusted under 35 U.S.C. 154(b) by 40 days.

(21) Appl. No.: 10/209,625

(22) Filed: Jul. 30, 2002

(65) Prior Publication Data

US 2002/0196528 A1 Dec. 26, 2002

Related U.S. Application Data

(63) Continuation of application No. 09/214,248, filed as application No. PCT/GB97/01701 on Jun. 25, 1997, now Pat. No. 6,483,632.

(30) Foreign Application Priority Data

Jun. 26, 1996 (GB) .............................................. 9613413

(51) Int. Cl.[7] .................................................. H01S 3/00
(52) U.S. Cl. .................................................. 359/337.4
(58) Field of Search .......................... 359/337.4, 341.1, 359/337.1

(56) References Cited

U.S. PATENT DOCUMENTS

| | | | | |
|---|---|---|---|---|
| 6,023,366 A | * | 2/2000 | Kinoshita | 359/337.12 |
| 6,049,418 A | * | 4/2000 | Srivastava et al. | 359/337.4 |
| 6,055,092 A | | 4/2000 | Sugaya et al. | 359/337 |
| 6,061,171 A | * | 5/2000 | Taylor et al. | 359/337.1 |
| 6,215,584 B1 | * | 4/2001 | Yang et al. | 359/337.4 |
| 6,236,499 B1 | * | 5/2001 | Berg et al. | 359/341.2 |
| 6,421,169 B1 | * | 7/2002 | Bonnedal et al. | 359/337.1 |
| 6,496,302 B1 | * | 12/2002 | Michishita | 359/337.1 |

FOREIGN PATENT DOCUMENTS

| | | | | |
|---|---|---|---|---|
| JP | 08248455 | | 9/1996 | G02F/1/35 |
| JP | 2000031573 A | * | 1/2000 | H01S/3/10 |

OTHER PUBLICATIONS

Becker et al. Erbium–Doped Fiber Amplifiers. Fundamentals and Technology. Academic Press. 1999. pp. 108–110.*
Weik, Martin H. Fiber Optics Standard Dictionary. 3rd Edition. 1997. p. 673.*
Zhou, "Power Management System Design Modelling of Optical Multi–Wavelength Transport Networks", IEEE, Nov. 28, 1994, pp. 1503–1507.

* cited by examiner

Primary Examiner—Thomas H. Tarcza
Assistant Examiner—Deandra M. Hughes
(74) Attorney, Agent, or Firm—Barnes & Thornburg LLP

(57) ABSTRACT

A variable gain optical amplifier, in which homogeneous gain broadening is dominant, has first and second fixed gain rare-earth doped optical waveguide amplifiers (21, 23) optically in series together with an intervening variable attenuation optical attenuator (22). This arrangement circumvents the problem of gain tilt encountered when operating such amplifiers under variable gain conditions. An alternative form of the module has variable gain waveguide amplifiers, but these are co-regulated so that the aggregate of their gain at a wavelength within the gain spectrum is maintained constant. A further alternative form of module is employed in a concatenation of such modules. In such a concatenation, the gain of individual modules is allowed to vary, but the aggregate of the gain, at a wavelength within the gain spectrum, of all the waveguide amplifiers of all the modules of the concatenation is maintained constant.

41 Claims, 6 Drawing Sheets

OPTICAL AMPLIFIER MODULES

RELATED APPLICATION

This application is a continuation of U.S. patent application Ser. No. 09/214,248, now U.S. Pat. No. 6,493,682 filed Sep. 20, 1999, which is the national filing of international application number PCT/GB97/01701 filed Jun. 25, 1997.

BACKGROUND OF THE INVENTION

This invention relates to optical amplifier modules in which homogeneous gain broadening is dominant, such as modules incorporating optically pumped rare-earth doped optical waveguide amplifiers.

Such optical amplifiers have an optical gain spectrum that varies with wavelength. The gain spectrum also depends on the operating conditions of the particular amplifier. To be more precise, for a fixed amplifier configuration, the gain spectrum will depend on the gain of the amplifier. In an optical communication system using multiple wavelengths for the transmission of data, the gain spectrum of the amplifier results in different signal channels having a different optical gain. Whilst small differences in gain may be tolerable, significant differences in gain are common causing degradation to some of the optical signal channels. In principle these differences can be cancelled out to some degree using selective optical filtering. However, when the operating gain of the amplifier changes due to a change in the incoming optical signal power, or the demanded optical output power, the resulting change in amplifier gain causes a change in the gain spectrum shape.

Specifically, at low gain, the spectral gain characteristic shows a slight rounded peak at the short wavelength end of the characteristic spaced by a shallow trough from a much broader, and slightly higher, peak extending to the long wavelength end of the characteristic, this broader peak having a slight upward tilt towards its long wavelength end. As the gain is increased, the amplitude of the broad peak increases unevenly, with the result that its tilt is first evened out, and then reversed. At the same time the amplitude of the short wavelength peak increases at a faster rate, overtaking the gain of the broad peak, and also broadening slightly to longer wavelengths. This change in the spectral gain characteristic consequent upon change of gain level is referred to as dynamic gain tilt. Because the effect is 'dynamic' it can not be compensated by optical filtering that is entirely passive. If dynamic gain tilt is present, and is not compensated, then different signal channels of a wavelength division multiplexed (WDM) transmission system will be subject to different differential gain under different conditions, with the result that some channels may suffer significant degradation limiting system performance.

SUMMARY OF THE INVENTION

The present invention is directed to the circumvention of the problem of dynamic gain tilt.

According to a first aspect of the present invention there is provided a variable gain amplifier module having a gain spectrum in which homogeneous broadening is dominant, which amplifier module includes at least two optical gain-providing regions and at least one loss-providing region, wherein the loss provided by said at least one loss-providing region is substantially uniform across the gain spectrum and is electrically variable, and wherein the amplifier module includes gain regulation means adapted to maintain substantially constant the spectral gain characteristic of the amplifier module by maintaining substantially constant, at a selected wavelength within the gain spectrum of the amplifier module, the aggregate gain of all the gain-providing regions of the amplifier module.

One preferred form of module has two gain-providing regions with a variable loss-providing region optically between them.

According to a second aspect of the present invention there is provided a method of operating a variable gain amplifier module having a gain spectrum in which homogeneous broadening is dominant, and which amplifier module includes at least two optical gain-providing regions and at least one loss-providing region, wherein the loss provided by said at least one loss-providing region is substantially uniform across the gain spectrum and is electrically variable, in which method of operating the amplifier module substantial invariance of the spectral gain characteristic of the amplifier module is maintained by maintaining substantially constant, at a selected wavelength within the gain spectrum of the amplifier module, the aggregate gain of all the gain-providing regions of the amplifier module.

According to a third aspect of the present invention there is provided, in a wavelength division multiplexed transmission system, a method of amplification by an amplifier module of optical wavelength division multiplexed traffic transmitted along a transmission path from a transmitter to a receiver, in which module the traffic is operated on by the module in succession first to amplify it for a first time using a first fixed gain optical waveguide optical amplifier, next to attenuate it by an amount that is variable, and then to amplify it for a second time using a second fixed gain rare-earth doped optical waveguide optical amplifier, wherein the first and second amplifiers are amplifiers that, under variable gain operating conditions, exhibit gain tilt.

According to a fourth aspect of the present invention there is provided a wavelength division multiplexed transmission system having a concatenation of optical amplifier modules in a transmission path between a transmitter and a receiver, each of which amplifier modules of the concatenation is a variable gain amplifier module having a gain spectrum in which homogeneous broadening is dominant, each containing at least one optical gain-providing region and at least one loss-providing region, wherein the loss provided by said at least one loss-providing region is substantially uniform across the gain spectrum and is electrically variable, wherein the concatenation includes gain regulation means adapted to maintain, under changes in the partitioning of the gain between the individual amplifier modules of the concatenation, substantially constant the spectral gain characteristic of the concatenation by maintaining substantially constant, at a selected wavelength within the gain spectrum of the amplifier modules, the aggregate gain of all the optical gain-providing regions of the concatenation.

According to a fifth aspect of the present invention there is provided, in a wavelength division multiplexed transmission system having an optical transmitter optically coupled with an optical receiver via a transmission path that includes a concatenation of optical amplifier modules having a gain spectrum in which homogeneous broadening is dominant, each containing at least one optical gain-providing region and at least one loss-providing region that provides a loss that is substantially uniform across the gain spectrum of the gain-providing regions and is electrically variable, a method of operating the concatenation to provide it with a substantially invariant spectral gain characteristic by regulating the gain, at a selected wavelength within the gain spectrum of the concatenation, of the amplifier modules of the concatenation so as to maintain, under changes in the partitioning of the gain between the individual amplifier modules of the concatenation, the aggregate gain of all the optical gain-providing regions of the concatenation.

BRIEF DESCRIPTION OF THE DRAWINGS

There follows a description of a wavelength division multiplexed (WDM) transmission system having a plurality of optical amplifier modules embodying the invention in a preferred form in the transmission path between a transmitter and a receiver. The description refers to the accompanying drawings in which.

DESCRIPTION OF THE PREFERRED EMBODIMENTS

Figure 1:
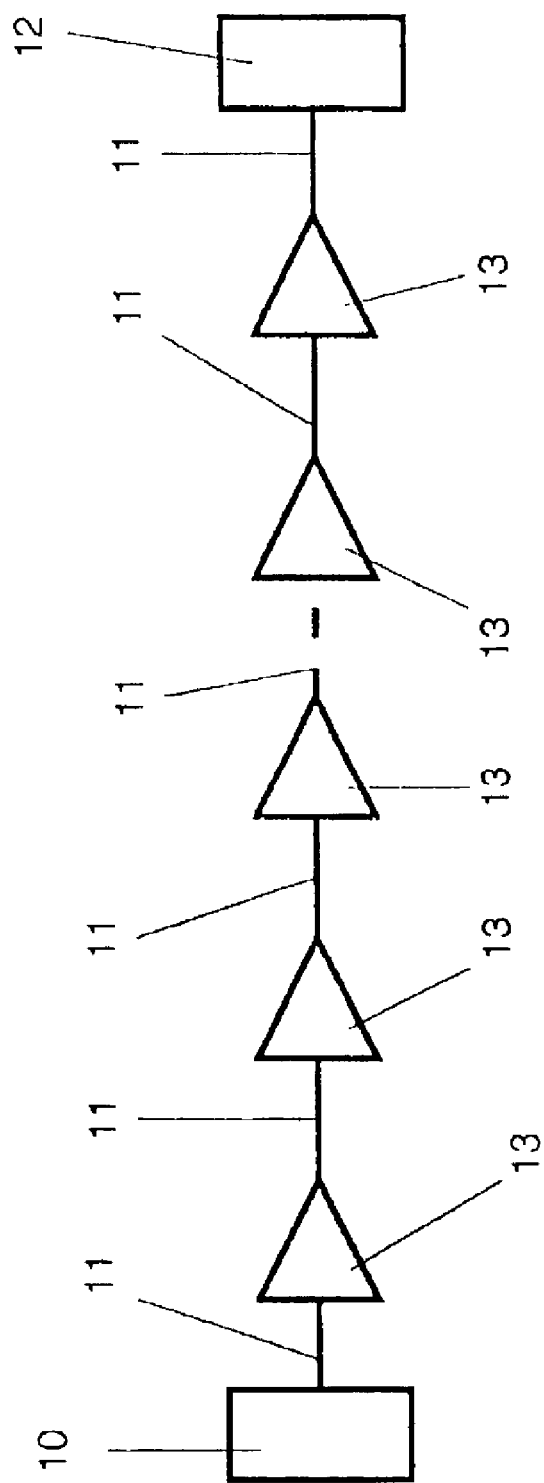
FIG. 1 is a block diagram of the WDM transmission system.

The transmission system of FIG. 1 comprises a WDM transmitter 10 typically arranged to launch a plurality of optical signals that are wavelength division multiplexed into one end of an optical fibre transmission path 11. At the far end of this path these signals are detected by a WDM receiver 12. At spaced intervals along the transmission path 11 are inserted a set of optical amplifier modules 13. Each optical amplifier module 13 includes at least one optical gain providing optically pumped rare-earth doped optical fibre amplifier.

Figure 2:
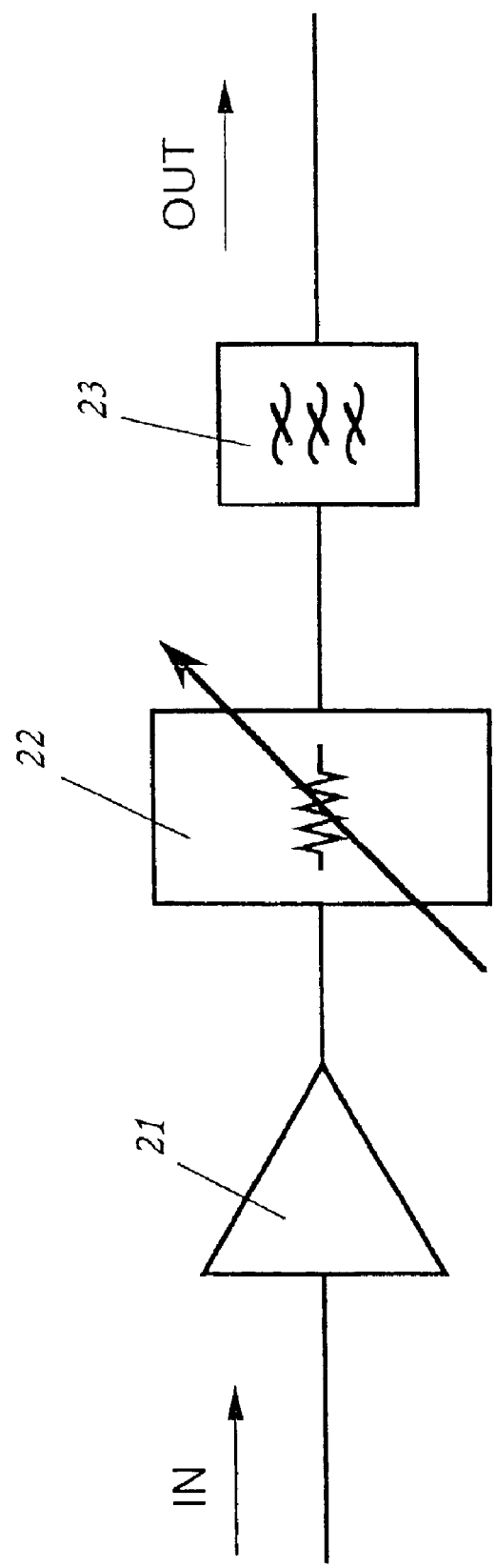
FIG. 2 is a block diagram of one example of one of the optical amplifier modules of the transmission system of FIG. 1, FIGS. 3 & 4 are block diagrams of the module of FIG. 2, connected respectively in a feed-forward and in a feed-back control environment.

The basic elements of a first preferred form of an amplifier module 13 of FIG. 1 is depicted in FIG. 2, and comprises a fixed gain rare-earth doped optical waveguide optical amplifier 21 and an electronically controllable variable attenuation optical attenuator 22. FIG. 2 shows the attenuator 22 located downstream of the amplifier 21, but alternatively it may be located upstream of it. Additionally the modulator 13 typically includes a passive gain-flattening filter 23 whose function is to smooth out the spectral gain characteristic of the fixed gain optical waveguide optical amplifier 21. The filter 23 may conveniently be a filter constructed in the manner described in EP 0 736 784 A.

There are known ways of clamping the amplifier 21 to provide fixed gain. A preferred way employs a supervisory laser (not shown) emitting at a wavelength, $\lambda_1$, within the amplification band but outside the signal band. The output of the supervisory laser is launched into the amplifier, and the amplitude of the portion output of the amplifier lying at the emission wavelength of the supervisory laser is measured. The amount of supervisory power launched into the amplifier is also measured, and a comparison of the two measures provides a measure of the gain provided by the laser at the supervisory laser wavelength.

A feedback control loop adjusts the pump power to the amplifier to stabilise the value of this gain to a predetermined value. Stabilising the gain at one wavelength, in this instance the emission wavelength, $\lambda_1$, of the supervisory laser, stabilises the gain values at all other wavelengths in a manner that is nominally independent of the input signal power levels so long as there is sufficient pump power available.

An alternative preferred method of clamping the gain of the amplifier 21 employs a pair of narrow-band reflectors, typically Bragg reflectors, located respectively at the upstream and downstream ends of the amplifier waveguide so as to combine to form a Fabry Perot laser cavity lasing at a wavelength, $\lambda_1$, within the amplification band but outside the signal waveband. The laser oscillation means that the round-trip amplifier gain at the laser oscillation wavelength is unity. This round-trip gain is determined in part by the reflectivity of the reflectors and in part by the (single transit) gain of the amplifier, and so that gain of the amplifier at this wavelength can be set to a desired value by choice of appropriate reflectivity values for the reflectors. Once the gain at the laser oscillation wavelength is fixed, the gain at other wavelengths is nominally maintained to be fixed so long as there is sufficient pump power available.

One form that the variable attenuation optical attenuator may take comprises a fibre-pigtailed module in which a linear variable neutral-density filter is mounted on a high precision linear sliding motor. Such a module is marketed by Santec under the designation OVA-610.

Figure 4:
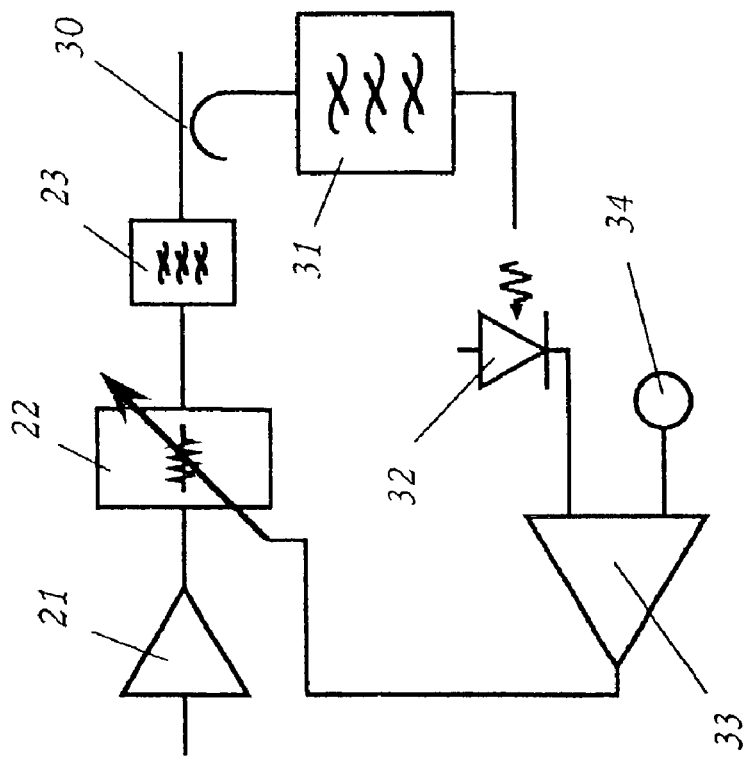
Figure 3:
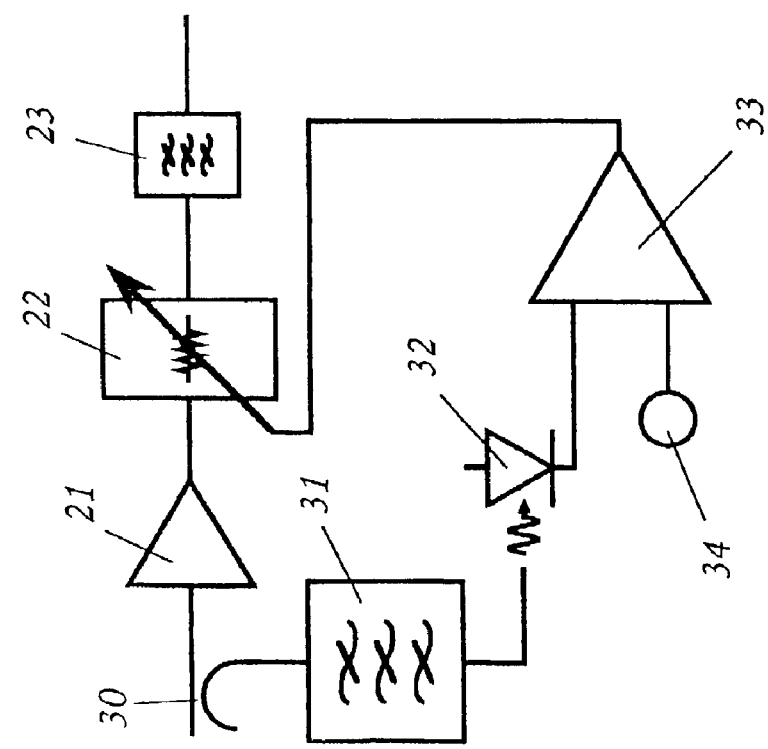

Regulation of the overall gain provided by the amplifier module is provided by regulation of the optical attenuation provided by its optical attenuator 22. Such regulation may for instance comprise feed-forward regulation in which the magnitude of the gain of the amplifier module is determined by the amplitude of the signal power applied to it, or it may comprise feed-back regulation in which the magnitude is determined by the amplitude of the signal power delivered by the module. The basic components of the feed-forward and feed-back regulation configurations are depicted respectively in FIGS. 3 and 4. In each case an optical tap 30 taps a small proportion of the optical power flowing through the amplifier and feeds it via an optical filter 31 to a photodetector 32. The output of the photodetector is fed to a differential amplifier 33 where it is compared with a reference level applied to terminal 34. The output of the differential amplifier is then applied as a control signal regulating the optical attenuation provided by the attenuator 22.

In FIG. 2 the amplifier module 13 is specifically depicted with its attenuator 22 located downstream of its optical waveguide amplifier 21. This may be considered the preferred arrangement because the input optical signal power to the module is typically quite low, and hence it is generally preferable, having regard to signal-to-noise considerations, to amplify the input signal before attenuating it rather than performing these operations in the reverse order. However, from module power output considerations it may be seen as desirable for the output of the module to be taken direct from the output of its optical waveguide amplifier rather than from that of its attenuator. Some way towards resolving these conflicting objectives is offered by the amplifier module depicted in FIG. 5. The basic elements of this amplifier module of FIG. 5 comprise, Connected optically in cascade, a first fixed gain rare-earth doped optical waveguide amplifier 51, a variable attenuation optical attenuator 52, and a second fixed gain rare-earth doped optical waveguide amplifier 53. The attenuator 52 of FIG. 5 performs the same function as the attenuator 22 of FIG. 2, and so these attenuators may be identical. Like the waveguide amplifier 21 of FIG. 2, the waveguide amplifiers 51 and 53 are typically doped with erbium.

Figure 5:
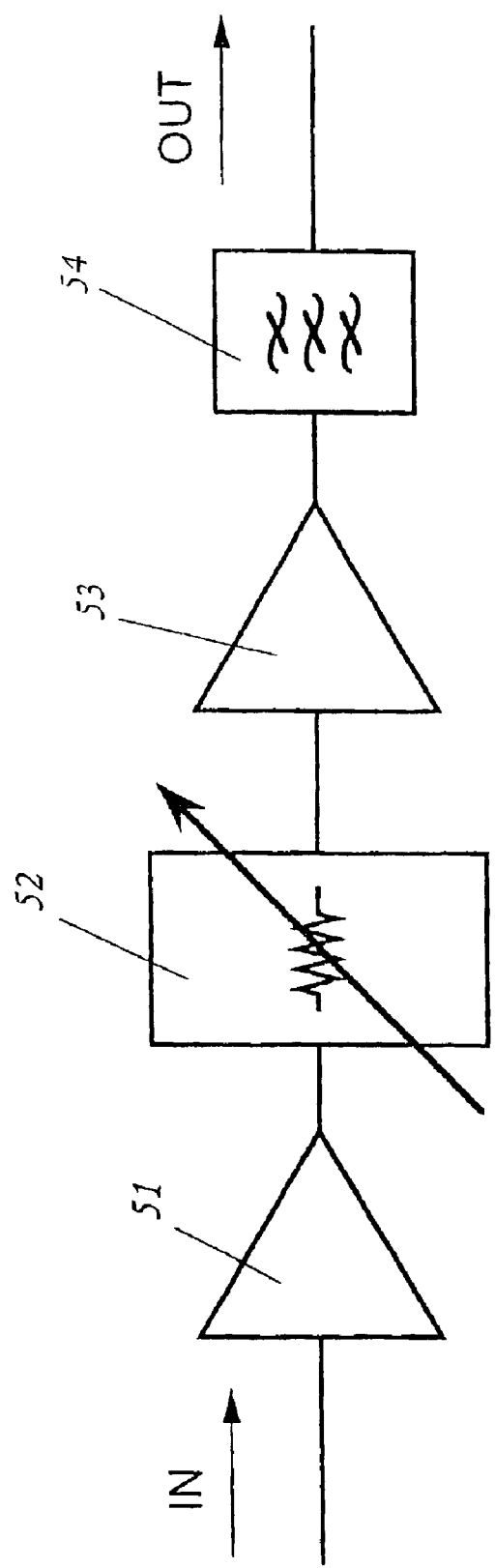
FIG. 5 is a block diagram of an alternative example of one of the optical amplifier modules of the transmission system of FIG. 1.

Clearly the use of fixed gain waveguide amplifiers 51 and 53 in the amplifier module of FIG. 5 will circumvent the problem of gain tilt in just the same manner that it is circumvented in the amplifier module of FIG. 2. If at a wavelength, $\lambda_1$, the ratio of the input to output powers for waveguide amplifier 51 is $G_1$, and if the corresponding ratio for the waveguide amplifier 53 is $G_2$, then the aggregate gain of the two waveguide amplifiers of the module is the product $G_1 \times G_2$. (Correspondingly, if the gains of the individual waveguide amplifiers had been expressed in dBs, then the aggregate gain (also expressed in dBs) will be the sum of the individual gains expressed in dBs.)

When an amplifier module as depicted in FIG. 5 is in use, the conditions of operation may change so much as to make it desirable to be able to alter the gain of the upstream waveguide amplifier 51, increasing its gain if the level of input signal power is particularly low, or decreasing it if the level is so high as to run the risk of producing saturation effects in the waveguide amplifier. Within the teaching of the present invention, this is entirely possible, provided that a complementary adjustment is made to the gain of the other waveguide amplifier, This complementary adjustment is such that if the gain at some wavelength, $\lambda_1$, of the waveguide amplifier 51 is change by some factor, k, then the gain at wavelength, $\lambda_1$, of waveguide amplifier 53 must be changed by the factor, 1/k. In this way the aggregate gain of the amplifier module is maintained constant while the partitioning of the gain between the waveguide amplifiers 51 and 53 is changed. one Of the results of the dominance of homogeneous gain broadening is that changes in the partitioning of the gain between the waveguide amplifiers, while maintaining constant their aggregate gain, leaves the spectral gain characteristic of the amplifier module unchanged.

Figure 6:
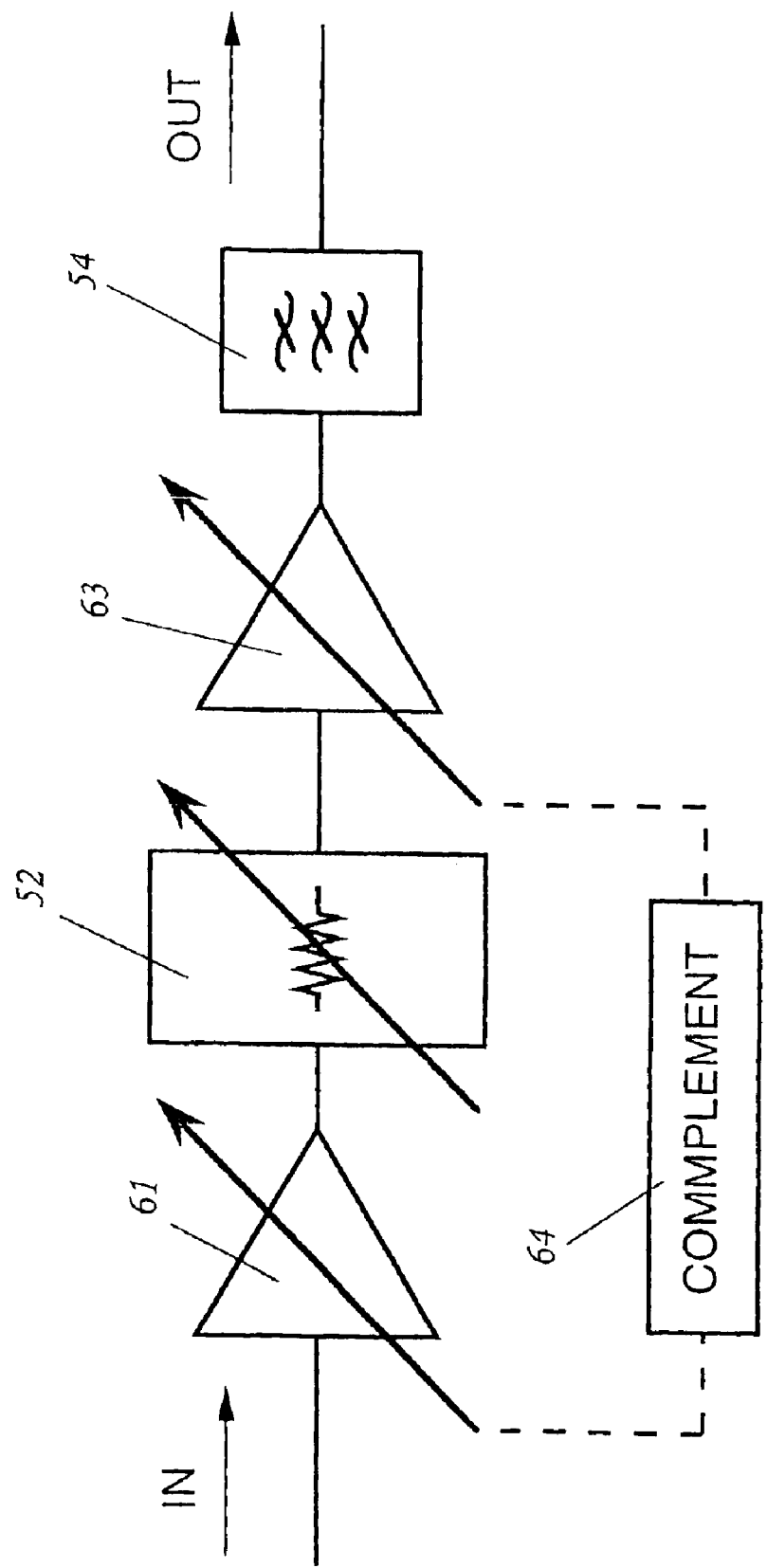
FIG. 6 is a block diagram of a modified for m of the amplifier module of FIG. 5.

FIG. 6 depicts the amplifier module of FIG. 5 modified by the replacement of the fixed gain waveguide amplifiers 51 and 53 by variable gain waveguide amplifiers 61 and 63. These variable gain waveguide amplifiers are depicted as being indirectly ganged via an element 64 that functions to provide the requisite complementary relationship between the values of gains at wavelength, $\lambda_1$, that they provide.

The foregoing analysis in respect of an amplifier module having two waveguide amplifiers respectively with gains $G_1$ and $G_2$ can be developed to apply in respect of the more general case of an amplifier module having n waveguide amplifiers with gains $G_1$, $G_2$, $G_3$, ... $G_{11}$ at some wavelength, $\lambda_1$. Arranging to maintain constant the aggregate of all the gains, $$\prod_{a=1}^{a=n} G_a,$$

will similarly ensure that the gain spectrum of the amplifier module will remain constant (i.e. will not suffer from the problems of gain tilt) under changes in the partitioning of the gain between the component waveguide amplifiers of the module.

Figure 7:
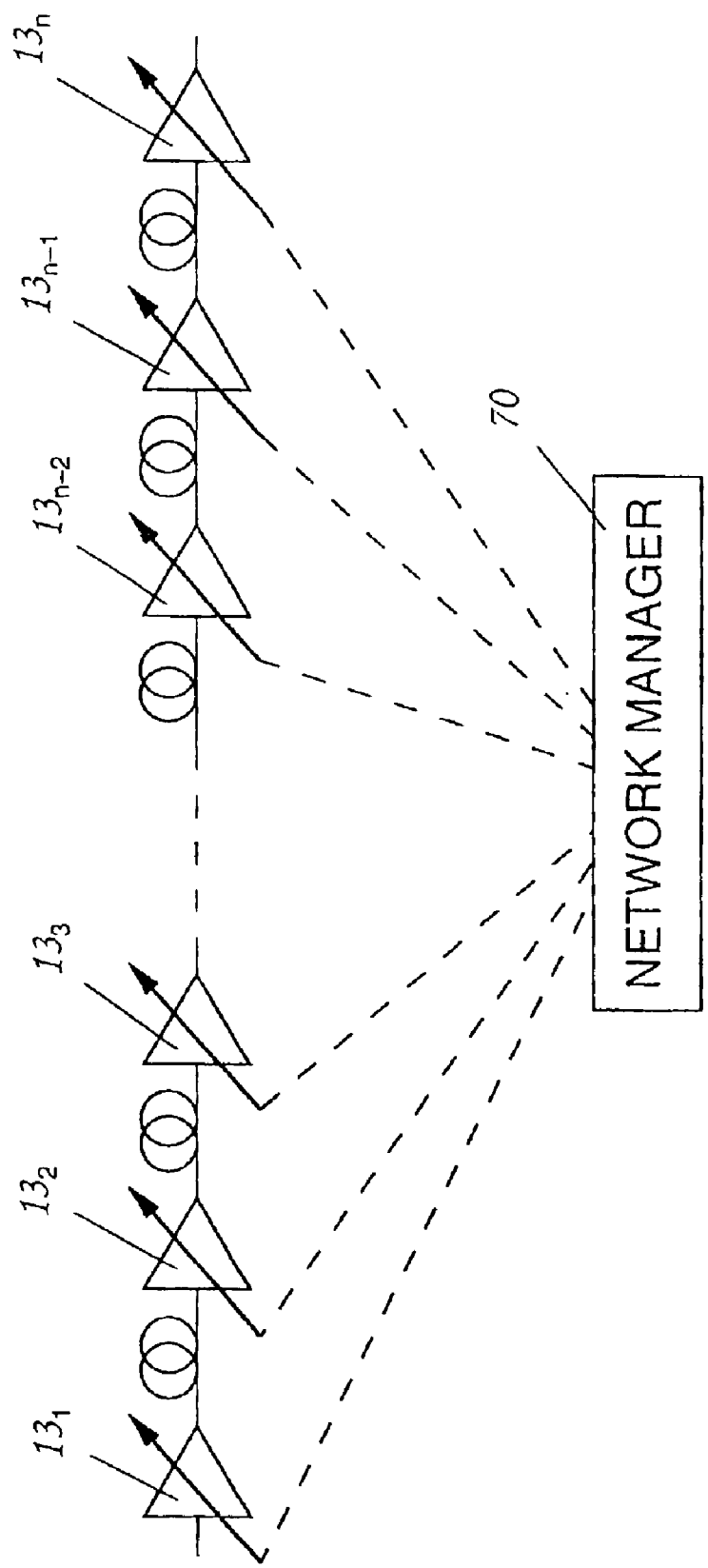
FIG. 7 is a block diagram of a particular form of concatenation of amplifiers of the transmission system of FIG. 1.

Developing further upon the foregoing, and noticing that there is no requirement for all the waveguide amplifiers to be at the same physical location, it can be seen that in respect of a concatenation of the amplifier modules 13 of FIG. 1, a concatenation as depicted more particularly in FIG. 7 and comprising amplifier modules $13_1$, $13_2$, $13_3$, ... $13_{n-2}$, $13_{n-1}$ and $13_n$, with aggregate module gains $GM_1$, $GM_2$, $GM_3$, ... $GM_{n-2}$, $GM_{n-1}$ and $GM_n$. Provided that the concatenation aggregate of all these aggregate gains, $$\prod_{a=1}^{a=n} GM_a,$$

is constant, the partitioning of the aggregate gain between these individual modules can be changed to suit changes in operating conditions without changing the overall gain spectrum of the concatenation. This partitioning is effected under the control of a network manager 70.

What is claimed is:

1. An optical amplifier module having optically in series:
   at least two optical amplifiers arranged collectively to provide a pre-determined level of aggregate gain, each optical amplifier exhibiting gain tilt under variable gain operating conditions;
   a variable attenuation optical attenuator; and
   a passive gain-flattening filter arranged to perform a gain-flattening function on a spectral gain characteristic of the aggregate gain provided by the said at least two optical amplifiers;
   wherein regulation of the overall gain of the optical amplifier module is provided by regulation of the optical attenuation provided by the variable optical attenuator.

2. An optical amplifier module as claimed in claim 1, wherein said at least two optical amplifiers comprise two optical amplifiers.

3. An optical amplifier module as claimed in claim 1 wherein said variable optical attenuator is located downstream of at least one of said at least two optical amplifiers, and wherein output from the optical amplifier module is taken from the output of one of said at least two optical amplifiers located downstream of said variable optical attenuator.

4. An optical amplifier module as claimed in claim 1, wherein the optical attenuator regulates the overall gain spectrum of the optical amplifier module.

5. An optical amplifier module as claimed in claim 1, wherein each optical amplifier comprises a rare-earth doped optical amplifier.

6. An optical amplifier module as claimed in claim 5, wherein the rare earth dopant is erbium.

7. An optical amplifier module as claimed in claim 1, wherein the predetermined level of aggregate gain is achieved by each optical amplifier providing a fixed predetermined level of gain.

8. An optical amplifier module as claimed in claim 1, wherein said at least two optical amplifiers include at least two variable gain optical amplifiers and the optical amplifier module further includes a gain controlling element arranged to partition gain between said at least two variable gain optical amplifiers at a given wavelength to maintain the aggregate gain of the optical amplifier module constant at the given wavelength.

9. An optical amplifier module as claimed in claim 1, wherein said filter is constituted in parts incorporated within each of said optical amplifiers.

10. An optical amplifier module as claimed in claim 1, wherein the variable optical attenuator is electronically controllable.

11. An optical amplifier module as claimed in claim 1, wherein the regulation is provided by a feed-forward regulation arrangement in which the magnitude of the gain of the amplifier module is determined by the amplitude of the power signal applied to it.

12. An optical amplifier module as claimed in claim 1, wherein the regulation is provided by a feed-back regulation arrangement in which the magnitude of the gain of the amplifier module is determined by the amplitude of the power signal delivered by the module.

13. A method of operating an optical amplifier module as claimed in claim 1, method comprising the steps of:
   collectively controlling the said at least two optical amplifiers to provide a constant pre-determined level of aggregate gain; and
   varying the optical attenuation provided by the variable optical attenuator to regulate the overall gain of the optical amplifier module.

14. A method as claimed in claim 13, wherein in the step of varying the optical attenuation, the overall gain spectrum of the optical amplifier module is regulated.

15. A method as claimed in claim 13, wherein in said step of varying the optical attenuation, the variation of the optical attenuation is electronically controlled.

16. A method as claimed in claim 13, wherein said step of regulating the optical attenuation comprises a feed-forward regulation step in which the magnitude of the gain of the amplifier module is determined by the amplitude of the power signal applied to it.

17. A method as claimed in claim 13, wherein said step of regulating the optical attenuation comprises a feed-back regulation step in which the magnitude of the gain of the amplifier module is determined by the amplitude of the power signal delivered by the module.

18. A concatenation of at least two optical amplifier modules, wherein each optical amplifier module comprises the following arranged optically in series: at least two optical amplifiers arranged collectively to provide a constant pre-determined level of aggregate gain, each optical amplifier exhibiting gain tile under variable gain operating conditions; and a variable attenuation optical attenuator; wherein regulation of the overall gain of the optical amplifier module is provided by regulation of the optical attenuation provided by the variable optical attenuator, wherein said at least two said optical amplifier modules are arranged to maintain the concatenated aggregate gain of the concatenation of optical amplifier modules at a predetermined level.

19. A Method of controlling the concatenated aggregate gain of a concatenation of at least two optical amplifier modules, wherein each optical amplifier module comprises the following arranged optically in series: at least two optical amplifiers arranged collectively to provide a constant pre-determined level of aggregate gain, each optical amplifier exhibiting gain tilt under variable gain operating conditions; and a variable attenuation optical attenuator; wherein regulation of the overall gain of the optical amplifier module is provided by regulation of the optical attenuation provided by the variable optical attenuator, wherein said at least two said optical amplifier modules are arranged to maintain the concatenated aggregate gain of the concatenation of optical amplifier modules at a predetermined level;
   the method of controlling the concatenated aggregate gain of the concatenation comprising the steps of:
   partitioning the aggregate gains between individual optical modules of said plurality of optical modules to maintain the overall gain spectrum of the concatenation at a predetermined level.

20. A wavelength division multiplexed transmission system having a concatenation of at least two optical amplifier modules, wherein each optical amplifier module comprises the following arranged optically in series: at least two optical amplifiers arranged collectively to provide a constant pre-determined level of aggregate gain, each optical amplifier exhibiting gain tilt under variable gain operating conditions; and a variable attenuation optical attenuator; wherein regulation of the overall gain of the optical amplifier module is provided by regulation of the optical attenuation provided by the variable optical attenuator, wherein said at least two said optical amplifier modules are arranged to maintain the concatenated aggregate gain of the concatenation of optical amplifier modules at a predetermined level, the system comprising the concatenation of optical amplifier modules provided in an optical transmission path between a transmitter and a receiver.

21. A wavelength division multiplexed system as claimed in claim 20, wherein the system further includes a network manager arranged to control partitioning of the concatenated aggregate gain provided by said at least two optical amplifier modules to maintain the overall gain spectrum of the concatenation at said predetermined level.

22. A wavelength division multiplexed transmission system as claimed in claim 20, comprising:
   a wavelength multiplexing (WDM) transmitter arranged to launch a plurality of wavelength division multiplexed optical signals along said optical fibre transmission path;
   a wavelength division multiplexing (WDM) receiver arranged to detect said plurality of wavelength division multiplexed optical signals at the far end of said optical transmission path; wherein said
   at least two optical amplifier modules are arranged at spaced intervals along said optical transmission path.

23. A wavelength division multiplexed transmission system as claimed in claim 20, wherein the overall gain spectrum of the concatenation of optical amplifier modules is maintained by partitioning the concatenated aggregate gain of the system between individual optical amplifier modules.

24. A wavelength division multiplexed transmission system as claimed in claim 20, wherein the concatenation includes gain regulation means adapted to maintain the spectral gain characteristics at the concatenation substantially constant under changes in the partitioning of the gain between the individual amplifier modules of the concatenation, by maintaining substantially constant, at a selected wavelength within the gain spectrum of the amplifier modules, the aggregate gain of all the optical amplifiers of the concatenation.

25. An optical amplifier module having optically in series:
   at least two at least two optical amplifiers arranged collectively to provide a pre-determined level of aggregate gain, each optical amplifier exhibiting gain tilt under variable gain operating conditions; and
   a variable attenuation optical attenuator;
   wherein regulation of the overall gain of the optical amplifier module is provided by regulation of the optical attenuation provided by the variable optical attenuator, and
   wherein the module has a gain spectrum in which homogenous broadening is dominant and wherein said variable optical attenuator comprises at least one loss-providing region, wherein the loss provided by said at least one loss-providing region is substantially uniform across the gain spectrum and is electrically variable, and wherein the amplifier module includes a gain regulation element adapted to maintain substantially constant the spectral gain characteristic of the amplifier module by maintaining substantially constant, at a selected wavelength within the gain spectrum of the amplifier module, the aggregate gain of all said at least two optical amplifiers of the amplifier module.

26. An optical amplifier module as claimed in claim 25, wherein the said at least two optical amplifiers consist of two optical amplifiers, and said variable optical attenuator is located optically between said two optical amplifiers.

27. A method of operating an optical amplifier module as claimed in claim 26, the method comprising the steps of:

collectively controlling the said at least two optical amplifiers to provide a constant pre-determined level of aggregate gain; and varying the optical attenuation provided by the variable optical attenuator to regulate the overall gain of the optical amplifier module.

28. A method as claimed in claim 27, wherein in the step of varying the optical attenuation, the overall gain spectrum of the optical amplifier module is regulated.

29. A method as claimed in claim 27, wherein in said step of regulating the optical attenuation the regulation is electronically controlled.

30. A method as claimed in claim 27, wherein said step of regulating the optical attenuation comprises a feed-forward regulation step in which the magnitude of the gain of the amplifier module is determined by the amplitude of the power signal applied to it.

31. A method as claimed in claim 27, wherein said step of regulating the optical attenuation comprises a feed-back regulation step in which the magnitude of the gain of the amplifier module is determined by the amplitude of the power signal delivered by the module.

32. A method as claimed in claim 27, which method of operating the amplifier module substantial invariance of the spectral gain characteristic of the amplifier module is maintained by maintaining substantially constant, at a selected wavelength within the gain spectrum of the amplifier module, the aggregate gain of all the gain-providing regions of the amplifier module.

33. A concatenation of at least two optical amplifier modules, each amplifier module comprising optically in series: at least two optical amplifiers arranged collectively to provide a pre-determined level of aggregate gain, each optical amplifier exhibiting gain tilt under variable gain operating conditions; and a variable attenuation optical attenuator; wherein regulation of the overall gain of the optical amplifier module is provided by regulation of the optical attenuation provided by the variable optical attenuator, and wherein the module has a gain spectrum in which homogenous broadening is dominant and wherein said variable optical attenuator comprises at least one loss-providing region, wherein the loss provided by said at least one loss-providing region is substantially uniform across the gain spectrum and is electrically variable, and wherein the amplifier module includes a gain regulation element adapted to maintain substantially constant the spectral gain characteristic of the amplifier module by maintaining substantially constant, at a selected wavelength within the gain spectrum of the amplifier module, the aggregate gain of all said at least two optical amplifiers of the amplifier module, wherein the concatenated aggregate gain of the concatenation of optical amplifier modules is maintained at a predetermined level.

34. A method of controlling the concatenated aggregate gain of a concatenation of a plurality of optical amplifier modules, each amplifier module comprising optically in series: at least two optical amplifiers arranged collectively to provide a pre-determined level of aggregate gain, each optical amplifier exhibiting gain tilt under variable gain operating conditions; and a variable attenuation optical attenuator; wherein regulation of the overall gain of the optical amplifier module is provided by regulation of the optical attenuation provided by the variable optical attenuator, and wherein the module has a gain spectrum in which homogenous broadening is dominant and wherein said variable optical attenuator comprises at least one loss-providing region, wherein the loss provided by said at least one loss-providing region is substantially uniform across the gain spectrum and is electrically variable, and wherein the amplifier module includes a gain regulation element adapted to maintain substantially constant the spectral gain characteristic of the amplifier module by maintaining substantially constant, at a selected wavelength within the gain spectrum of the amplifier module, the aggregate gain of all said at least two optical amplifiers of the amplifier module, the method of controlling the concatenated aggregate gain comprising the steps of:

partitioning the aggregate gains between individual optical modules of said plurality of optical modules to maintain the overall gain spectrum of the concatenation at a predetermined level.

35. A wavelength division multiplexed transmission system having a concatenation of at least two optical amplifier modules, each amplifier module comprising optically in series: at least two optical amplifiers arranged collectively to provide a pre-determined level of aggregate gain, each optical amplifier exhibiting gain tilt under variable gain operating conditions and a variable attenuation optical attenuator, wherein regulation of the overall gain of the optical amplifier module is provided by regulation of the optical attenuation provided by the variable optical attenuator, and wherein the module has a gain spectrum in which homogenous broadening is dominant and wherein said variable optical attenuator comprises at least one loss-providing region, wherein the loss provided by said at least one loss-providing region is substantially uniform across the gain spectrum and is electrically variable, and wherein the amplifier module includes a gain regulation element adapted to maintain substantially constant the spectral gain characteristic of the amplifier module by maintaining substantially constant, at a selected wavelength within the gain spectrum of the amplifier module, the aggregate gain of all said at least two optical amplifiers of the amplifier module, wherein the concatenated aggregate gain of the concatenation of optical amplifier modules is maintained at a predetermined level, the wavelength division multiplexed transmission system comprising the concatenation of optical amplifier modules provided in an optical transmission path between a transmitter and a receiver.

36. A wavelength division multiplexed system as claimed in claim 35, wherein said optical amplifier modules include at least one optical gain providing optically pumped rare-earth doped optical fibre amplifier.

37. A wavelength division multiplexed system as claimed in claim 35, further comprising a network manager arranged to control partitioning of the aggregate gain provided by said at least two optical amplifier modules to maintain the overall gain spectrum of the concatenation at said predetermined level.

38. A wavelength division multiplexed transmission system as claimed in claim 26, wherein the transmitter is a wavelength division multiplexed (WDM) transmitter arranged to launch a plurality of wavelength division multiplexed optical signals along said optical fibre transmission path and the receiver is a wavelength division multiplexed (WDM) receiver arranged to detect said plurality of wavelength division multiplexed optical signals at the far end of said optical fibre transmission path; and wherein said at least two optical amplifier modules are arranged at spaced intervals along the optical fibre transmission path.

39. A wavelength division multiplexed transmission system as claimed in claim 35, wherein the overall gain spectrum of the concatenation of optical amplifier modules is maintained by partitioning the aggregate gain between individual optical amplifier modules.

40. A wavelength division multiplexed transmission system as claimed in claim 35, wherein the concatenation includes gain regulation means adapted to maintain the spectral gain characteristic of the concatenation substantially constant under changes in the partitioning of the gain between the individual amplifier modules of the concatenation, by maintaining substantially constant, at a selected wavelength within the gain spectrum of the amplifier modules, the aggregate gain of all the optical amplifiers of the concatenation.

41. In a wavelength division multiplexed transmission system having an optical transmitter optically coupled with an optical receiver via a transmission path that includes a concatenation of optical amplifier modules having a gain spectrum in which homogeneous broadening is dominant, each containing at least one optical gain-providing region and at least one loss-providing region that provides a loss that is substantially uniform across the gain spectrum of the gain-providing regions and is electrically variable, a method of operating the concatenation to provide it with a substantially invariant spectral gain characteristic by regulating the gain, at a selected wavelength within the gain spectrum of the concatenation, of the amplifier modules of the concatenation so as to maintain, under changes in the partitioning of the gain between the individual amplifier modules of the concatenation, the aggregate gain of all the optical gain-providing regions of the concatenation.

* * * * *